United States Patent
Choudhury et al.

(10) Patent No.: US 8,971,195 B2
(45) Date of Patent: Mar. 3, 2015

(54) QUERYING HEALTH OF FULL-MESHED FORWARDING PLANES

(75) Inventors: Sanjaya Choudhury, Cary, NC (US); Amir H. Maleki, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 12/985,983

(22) Filed: Jan. 6, 2011

(65) Prior Publication Data
US 2012/0176914 A1    Jul. 12, 2012

(51) Int. Cl.
*H04L 12/26* (2006.01)
*H04L 12/701* (2013.01)

(52) U.S. Cl.
CPC ............ *H04L 43/10* (2013.01); *H04L 43/0811* (2013.01); *H04L 45/00* (2013.01)
USPC .......................................................... 370/248

(58) Field of Classification Search
None
See application file for complete search history.

(56) References Cited

U.S. PATENT DOCUMENTS

| | | | |
|---|---|---|---|
| 7,336,615 B1 * | 2/2008 | Pan et al. ....................... | 370/248 |
| 7,420,933 B2 | 9/2008 | Booth, III et al. | |
| 7,535,856 B2 | 5/2009 | Booth, III et al. | |
| 7,599,303 B2 * | 10/2009 | Nadeau et al. ................. | 370/248 |
| 7,644,317 B1 | 1/2010 | Sajassi et al. | |
| 7,668,178 B2 | 2/2010 | Martini et al. | |
| 7,697,534 B1 | 4/2010 | Narayanan et al. | |
| 7,733,784 B2 * | 6/2010 | Nam et al. ..................... | 370/238 |
| 7,751,399 B2 | 7/2010 | Martini et al. | |
| 7,769,037 B2 | 8/2010 | Booth, III et al. | |
| 7,773,611 B2 | 8/2010 | Booth, III et al. | |
| 7,778,199 B2 | 8/2010 | Booth, III et al. | |
| 7,782,841 B2 | 8/2010 | Rampal et al. | |
| 7,808,919 B2 | 10/2010 | Nadeau et al. | |
| 2004/0078683 A1 * | 4/2004 | Buia et al. ....................... | 714/37 |
| 2004/0081101 A1 * | 4/2004 | Bennett ......................... | 370/252 |
| 2004/0264389 A1 * | 12/2004 | Abdo et al. .................... | 370/255 |
| 2005/0018611 A1 * | 1/2005 | Chan et al. ..................... | 370/241 |
| 2005/0105475 A1 * | 5/2005 | Norrgard et al. .............. | 370/254 |
| 2005/0216442 A1 * | 9/2005 | Liskov et al. ...................... | 707/1 |
| 2006/0171331 A1 * | 8/2006 | Previdi et al. ................. | 370/254 |
| 2006/0245436 A1 | 11/2006 | Sajassi | |
| 2006/0262772 A1 * | 11/2006 | Guichard et al. ............. | 370/351 |

(Continued)

OTHER PUBLICATIONS

Allan, D., et al., "A Framework for Multi-Protocol Label Switching (MPLS) Operations and Management (OAM)," Network Working Group, RFC 4378, Feb. 2006, pp. 1-11.

(Continued)

*Primary Examiner* — Steve Young
(74) *Attorney, Agent, or Firm* — Novak Druce Connolly Bove + Quigg LLP (57) ABSTRACT

In one embodiment, an originating node in a full-mesh computer network receives a trigger to determine integrity of the full-mesh network's data-paths. The originating node determines an ordered list of nodes in the full-mesh computer network. The originating node then sends echo requests to each non-originating node of the ordered list. The originating node may later receive consolidated echo responses from at least some non-originating nodes to which an echo request was sent. Each consolidated echo response indicates a response from the respective non-originating node, and any responses to subsequent echo requests sent by that particular non-originating node to subsequent nodes. The originating node may then use these responses to determine a connectivity status of the full-mesh computer network.

18 Claims, 8 Drawing Sheets

(56) References Cited

U.S. PATENT DOCUMENTS

| | | | |
|---|---|---|---|
| 2006/0285498 A1* | 12/2006 | Wakumoto et al. | 370/248 |
| 2007/0025277 A1* | 2/2007 | Sajassi et al. | 370/256 |
| 2007/0162595 A1 | 7/2007 | Samprathi | |
| 2007/0178922 A1* | 8/2007 | Yamada et al. | 455/513 |
| 2008/0175228 A1 | 7/2008 | Chang et al. | |
| 2008/0285466 A1 | 11/2008 | Salam et al. | |
| 2009/0238084 A1 | 9/2009 | Nadeau et al. | |
| 2010/0097943 A1* | 4/2010 | D'Souza et al. | 370/248 |

OTHER PUBLICATIONS

Nadeau, T., et al., "Pseudowire Virtual Circuit Connectivity Verification (VCCV): A Control Channel for Pseudowires," Network Working Group, RFC 5085, Dec. 2007, pp. 1-30.

Kompella, K., et al, "Detecting MPLS Data Plane Failures," Network Working Group, draft-ietf-mpls-lsp-ping-13.txt, Jan. 2006, pp. 1-51.

"Implementing Multipoint Layer 2 Bridging Services (VPLS) on Cisco ASR 9000 Series Routers," Cisco Systems, Inc., Retrieved on Jan. 6, 2011, pp. 199-250.

* cited by examiner

QUERYING HEALTH OF FULL-MESHED FORWARDING PLANES

TECHNICAL FIELD

The present disclosure relates generally to computer networks, and, more particularly, to querying health of forwarding planes of full-meshed computer networks.

BACKGROUND

Often, nodes of a computer network are connected in a "full-mesh" topology, where each node is interconnected with each and every other node in the computer network. For example, in a virtual private local area network (LAN) service (VPLS), there are generally a large number of pseudowires (PWs) participating in a full-mesh between provider edge devices (PEs).

Currently, if an administrator wants to troubleshoot the data-path of the full-mesh, he or she needs to individually log in to the participating nodes (e.g., PEs) and use a querying tool on each neighboring node to diagnose the integrity of PWs. One example querying tool is available through the virtual circuit connectivity verification (VCCV) infrastructure, which defines a set of tools that may be used to troubleshoot the data-path of individual virtual circuits (e.g., PWs). The process of logging in to each node and querying the health of each link (e.g., virtual circuit), however, is particularly cumbersome and inefficient. In addition, the process of querying each particular virtual circuit becomes exceedingly tedious where nodes are added to a full-mesh dynamically.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an originating node receives a trigger in a full-mesh computer network to determine integrity of the full-mesh network's data-paths. The originating node determines an ordered list of nodes in the full-mesh computer network. The originating node then sends echo requests to each non-originating nodes of the ordered list. The originating node may later receive a consolidated echo response from at least some non-originating nodes to which an echo request was sent. Each consolidated echo response indicates a response from the respective non-originating node, and any responses to subsequent echo requests sent by that particular non-originating node to subsequent nodes. The originating node may then use these responses to determine a connectivity status of the full-mesh computer network.

Also, according to one or more embodiments of the disclosure, a non-originating node in a full-mesh computer network receives an echo request from an originating node. In response to the echo request, the non-originating node sends subsequent echo requests to one or more subsequent nodes on an order list of nodes. The non-originating node receives an echo response from at least some of the subsequent nodes to which an echo request was sent. The non-originating node sends a consolidated echo response to the originating node, where the consolidated echo response indicates a response from the non-originating node, and any responses to subsequent echo requests sent by the non-originating node to subsequent nodes.

DESCRIPTION

Network Configuration

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
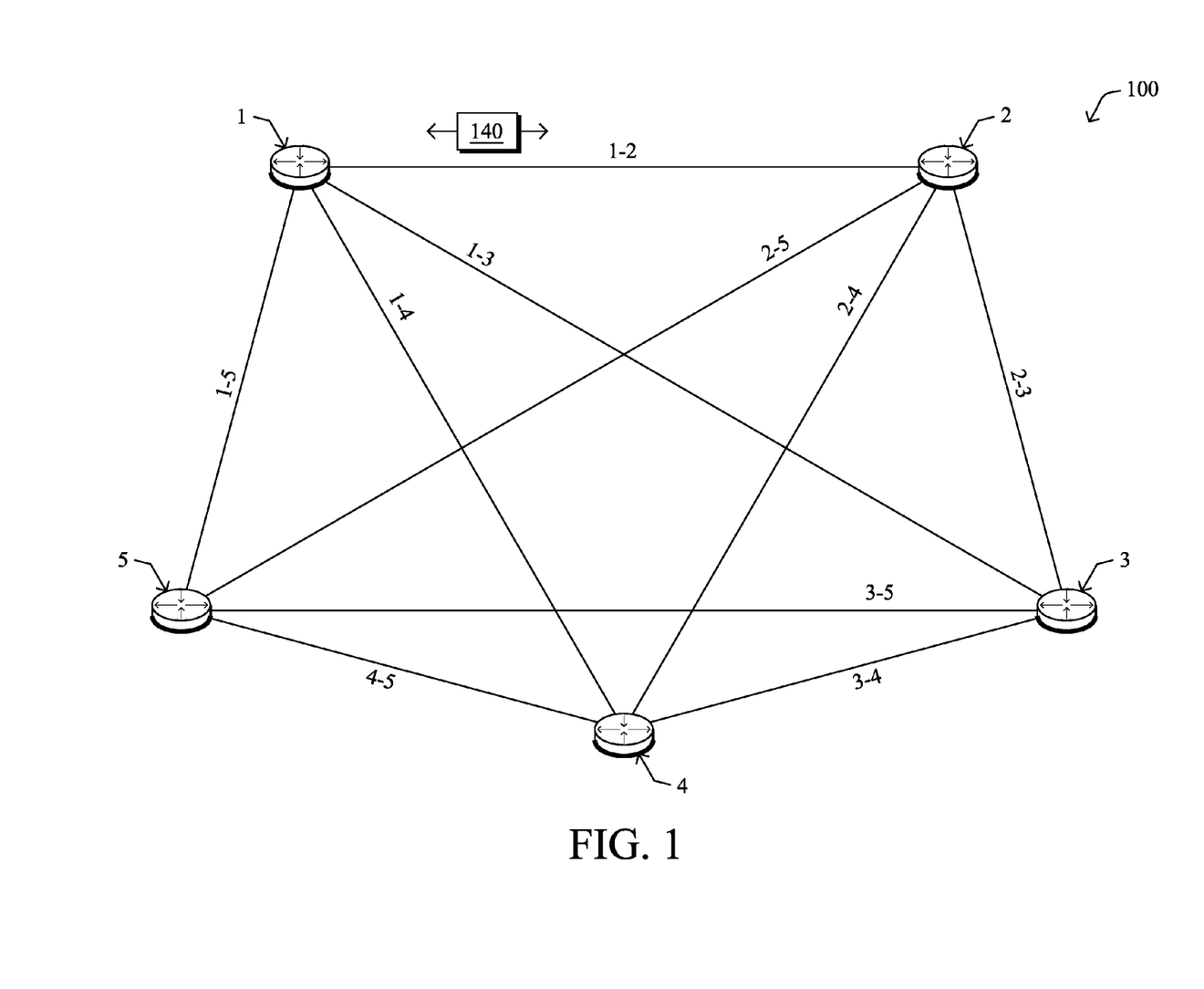
FIG. 1 illustrates an example computer network.

FIG. 1 is a schematic block diagram of an example computer network 100 illustratively comprising nodes/devices interconnected in a full-mesh by links as shown. For example, the nodes may be provider edge devices (PEs) of a provider network, such as for virtual private LAN services (VPLS)

entity. Illustratively, there are five nodes shown in a full-mesh arrangement, labeled 1-5, and as used herein, each of the labels may (though need not) correspond to an actual node identification (ID), such as an address within a network or an identification particular to each node (e.g., 1.1.1.1, 1.1.1.2, 1.1.1.3, 1.1.1.4, and 1.1.1.5). Further, the links as shown, and labeled based on their corresponding endpoints (e.g., link 1-2, or 2-1, is the link between nodes 1 and 2, and so on), may comprise physical/wired links or wireless links, and may be logically arranged as a virtual circuit, such as a pseudowire (PW), tunnel, etc. Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, etc.

Also, data packets 140 (e.g., traffic/messages sent between the nodes) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
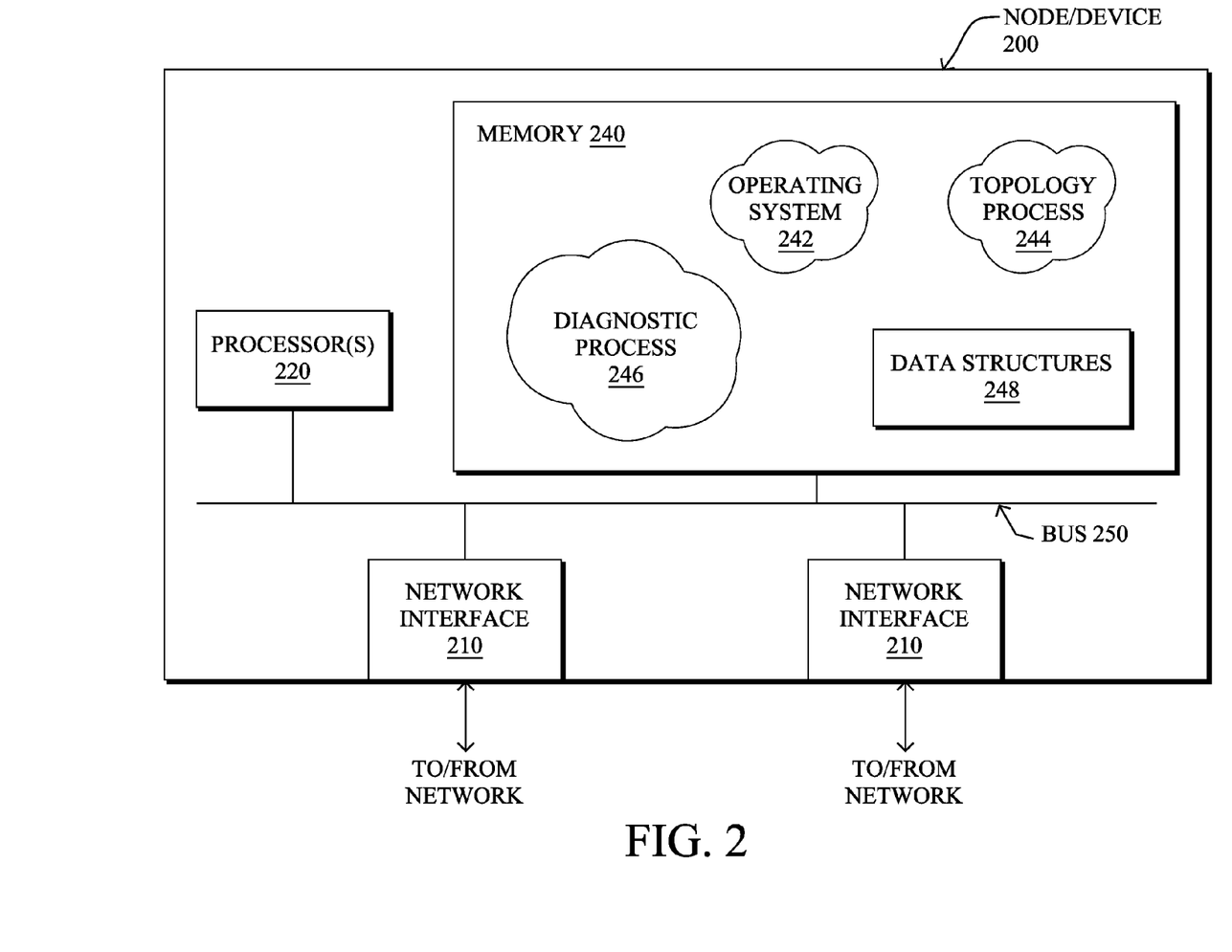
FIG. 2 illustrates an example network device/node.

FIG. 2 is a schematic block diagram of an example node/device 200 that may be used with one or more embodiments described herein, e.g., as nodes 1-5. The device comprises a plurality of network interfaces 210, one or more processors 220, and a memory 240 interconnected by a system bus 250. The network interfaces 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network is interface 210 may also be used to implement one or more virtual network interfaces, such as for Virtual Private Network (VPN) access.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 248. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise topology (e.g., routing) services 244 and a diagnostic process 246, as described herein.

It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

Topology/Routing service (or process) 244 contains computer executable instructions executed by processor 220 to perform functions provided by one or more topology management (e.g., routing) protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among nodes 200 using routing protocols, such as the OSPF and IS-IS link-state protocols (e.g., to "converge" to an identical view of the network topology). Further, routing services 247 may also perform functions related to virtual routing protocols, such as maintaining VRF instances (not shown), or tunneling protocols, such as for Multi-Protocol Label Switching, etc., each as will be understood by those skilled in the art.

Referring back to FIG. 1, full-mesh topologies, where each node is interconnected with each and every other node in the computer network, are often burdensome when troubleshooting the data-path (forwarding plane). For instance, an administrator typically needs to individually log in to the participating nodes (e.g., FIG. 1, nodes 1-5) and use a querying tool on each neighboring node to diagnose the integrity (e.g., status, connectivity, configuration, etc.) of the nodes. As also stated, virtual circuit connectivity verification (VCCV) infrastructure provides an example querying tool to troubleshoot the data-path of individual virtual circuits (e.g., PWs). For instance, the Internet Engineering Task Force (IETF) has provided requests for comments (RFCs) that provide certain techniques (e.g., protocols, standards, etc.) for querying individual links, such as RFC4378 and RFC5085 (available from the IETF). However, the process of logging in to each node and querying the health of each link (e.g., virtual circuit) is particularly cumbersome and inefficient, and particularly difficult where nodes are added to a full-mesh (e.g., VPLS entity) dynamically.

Efficiently Querying Full-Mesh Health

According to one or more embodiments of the disclosure, techniques are described that allow an administrator (or other user or entity) to determine (e.g., diagnose, troubleshoot, etc.) the integrity of the full-mesh network's data-paths from any participating node. In particular, to query the health of a full-mesh network (e.g., its status, connectivity, configuration, etc.), even where nodes are dynamically added and/or removed from the full-mesh, one or more embodiments herein allow an administrator (or other user or entity) to log in to one of the participating nodes (an originating node), and to query the entire full-mesh network from that single node with a single command to determine/validate the actual data-path (forwarding plane) status of the full-mesh network (e.g., VPLS entity).

Specifically, in one or more embodiments as described herein, an originating node in a full-mesh computer network receives a trigger (e.g., a "member circuit query" command from an administrator or other user or entity), to determine the integrity of the full-mesh network's data-paths. In response to the trigger, the originating node may determine an ordered list of nodes in the full-mesh network. The originating node may then successively send an echo request to each of the other nodes, for example, based on one or more heuristics (e.g., beginning with a lowest node on the ordered list), and waits for a configurable amount of time after sending each echo request for a response. As described below, non-originating nodes respond to this echo request with special consolidated echo responses that indicate a response for the respective non-originating node, as well as responses to any echo requests issued by the respective non-originating node to its own neighboring nodes.

If a consolidated echo response to the echo request is received at the originating node within the configurable amount of time, the originating node may proceed to send an echo request to the next node on the ordered list. If a consolidated echo response is not received at the originating node within the configurable amount of time, the originating node may insert a special data structure (e.g., an explicit query node list) into any subsequent echo requests, identifying the node that did not produce a response, and requesting focused testing be directed to such node. Based on the consolidated echo responses, a connectivity status of the full-mesh network may be determined. The query response indicating the connectivity status of the full-mesh computer network, including any failures, may be generated, and for example, presented to the administrator or other user.

As mentioned above, when a non-originating node receives an echo request according to one or more embodiments of the disclosure, the non-originating node may, for example, determine the ordered list of nodes in the full-mesh computer network. The non-originating node may then send echo requests to certain ones of its neighbors based on one or more heuristics (e.g., to all neighbors other than the originating node that are higher on the ordered list than the non-originating node). After a configurable amount of time has elapsed for echo responses to be received at the non-originating node from its neighbors, the non-originating node consolidates any received echo responses, and responds to the original echo request from the originating node with a consolidated echo response that indicates its own response, and the responses to its echo requests.

The ordered lists used in the above discussed techniques may be determined based on control plane configuration (e.g., topology process 244). For example, in a VPLS entity, member nodes may be dynamically added and/or removed, and various control plane discovery and/or management protocols may be used to maintain a list of member nodes (e.g., in table 248). The list may be ordered based on a node ID (e.g., an Internet Protocol ("IP") address, Media Access Control (MAC) address, or other unique address or identifier) of each of the nodes. For example, the list may be ordered from high to low node ID values (i.e., decreasing order) or, as shown in the examples depicted herein, from low to high node ID values (i.e., increasing order). The ordering methodology may be configured on each of the nodes in advance, or may be distributed through configuration messages or within the echo requests themselves.

In an alternative embodiment of the present disclosure, instead of determining the ordered list independently at each of the non-originating nodes and applying heuristics, the non-originating nodes may be explicitly instructed which other nodes to send subsequent echo requests by a data structure (e.g., an explicit query node list) in the echo request message received by the respective non-originating node from the originating node. In such an alternative embodiment, the originating node may thereby explicitly direct the second-level of echo requests.

Illustratively, the techniques described herein may be performed by hardware, software, and/or firmware, such as in accordance with a diagnostic process 246, which may contain computer executable instructions executed by the processor 220 to perform functions relating to the techniques described herein, e.g., in conjunction with topology process 244.

Figure 3:
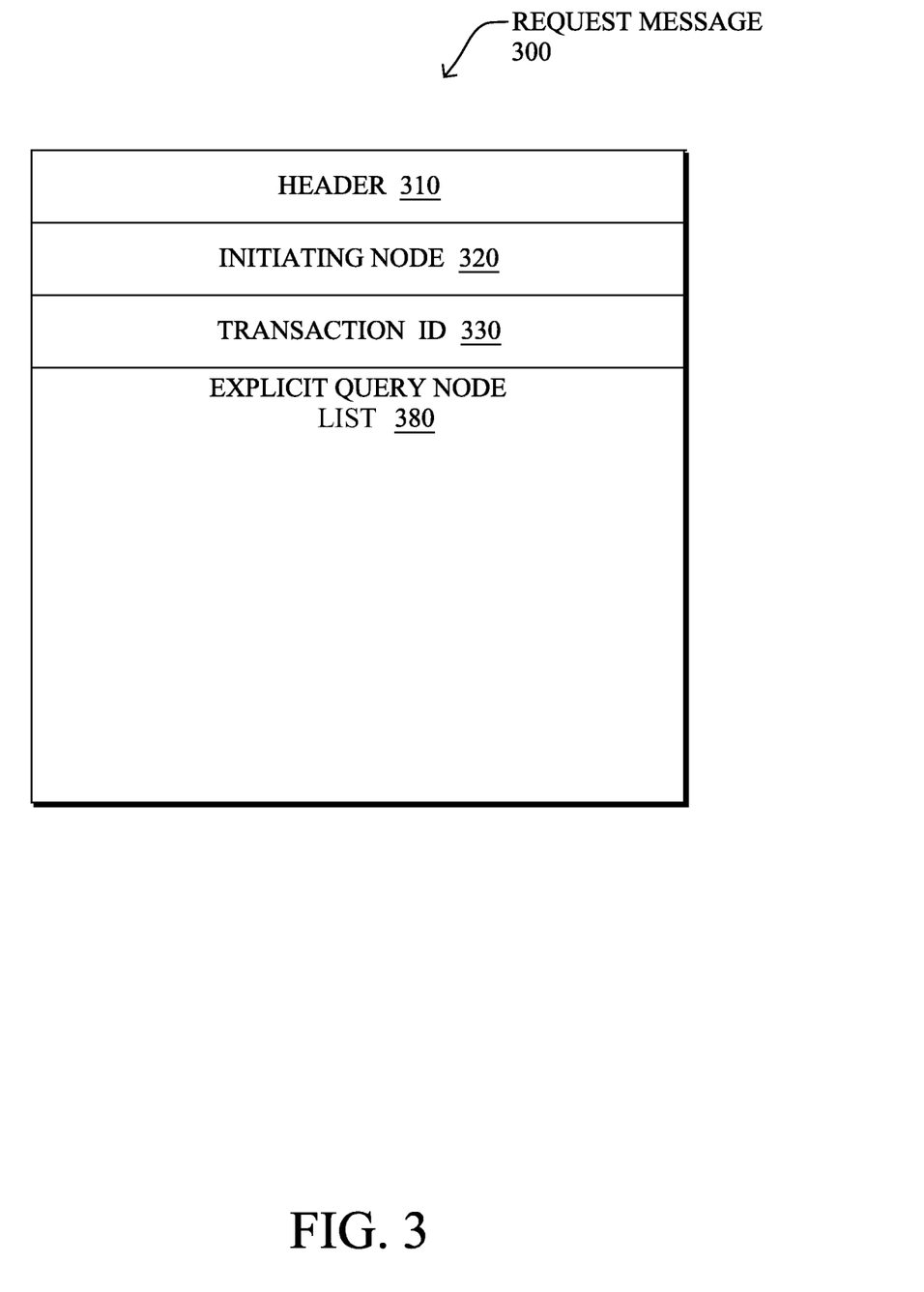
FIG. 3 illustrates an example echo request message.

FIG. 3 illustrates an example echo request message 300 that may be used in accordance with one or more techniques described herein. For example, message 300 (and 400 below) may take advantage of existing virtual circuit connectivity verification (VCCV) protocol capabilities (e.g., including periodic PW status monitoring tools). Message 300 may comprise a plurality of fields, such as a header 310, an initiating node field 320, and possibly an explicit query node list 330. The header 310 may comprise various information used to transport the message (e.g., a packet/frame 140) across the network, such as source and destination addresses, various encapsulation labels, etc., depending upon the underlying network. The initiating node field 320, which may be simply the source address field of header 310, contains an ID of the node transmitting the echo request message 300. The explicit query node list 330 may comprise a list of node IDs, explicit instructions and/or algorithms, etc., for specifying which other nodes to query.

Figure 4:
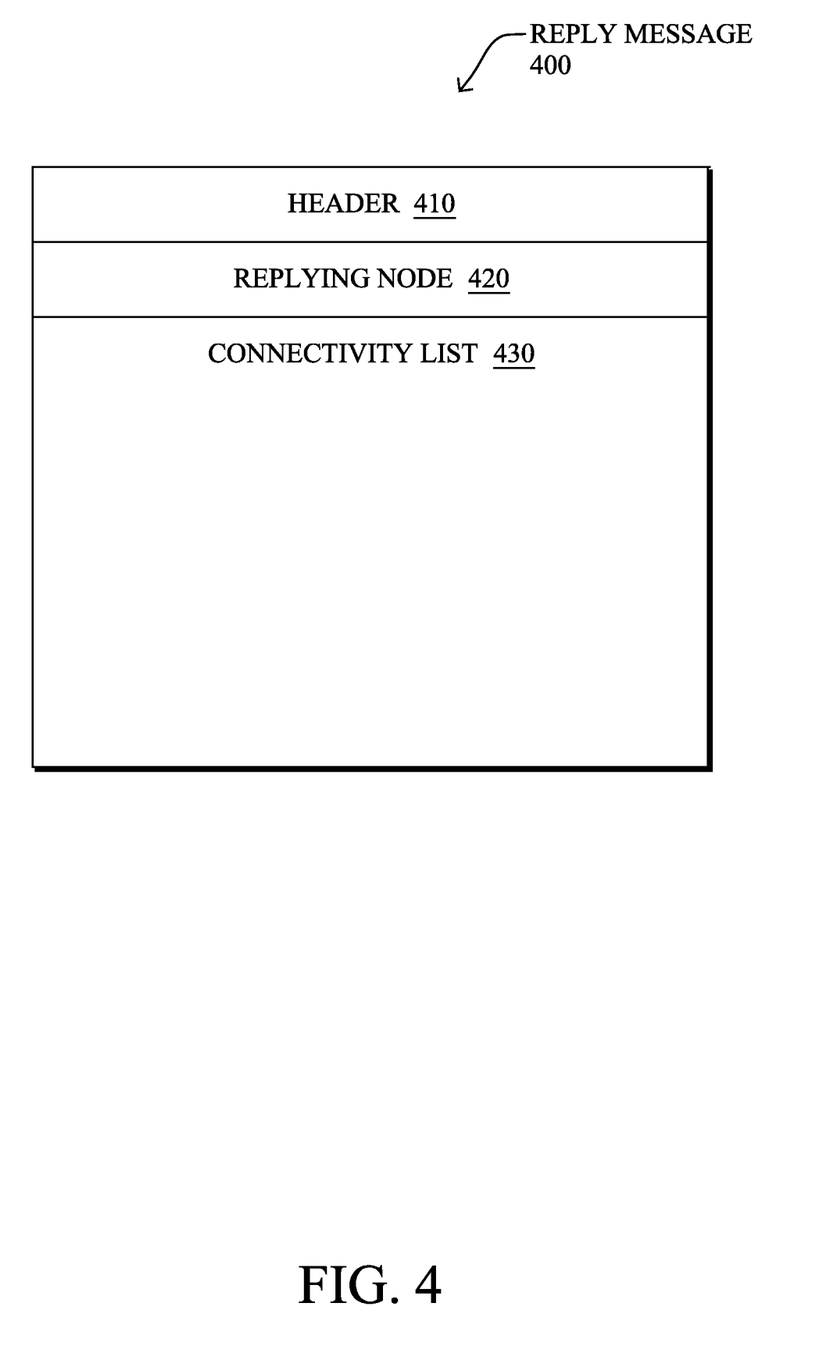
FIG. 4 illustrates an example echo response message.

FIG. 4 illustrates an example consolidated echo response message 400 that may be used in accordance with one or more techniques described herein. Again, a header 410 may be used based on the transport of the message, and a replying node ID field 420 (e.g., the source field within header 410 or other specific field) may be used to indicate the sender of the reply message. Further, as described below, a "connectivity list" field 430 may comprise a list of one or more nodes for which the consolidated echo response is indicating connectivity. Moreover, in certain embodiments where more than a simple connectivity response is used, additional information (e.g., configuration, status, timing, etc.) may be included in connectivity list field 430, or within additional specific fields, as may be appreciated by those skilled in the art.

Figure 5:
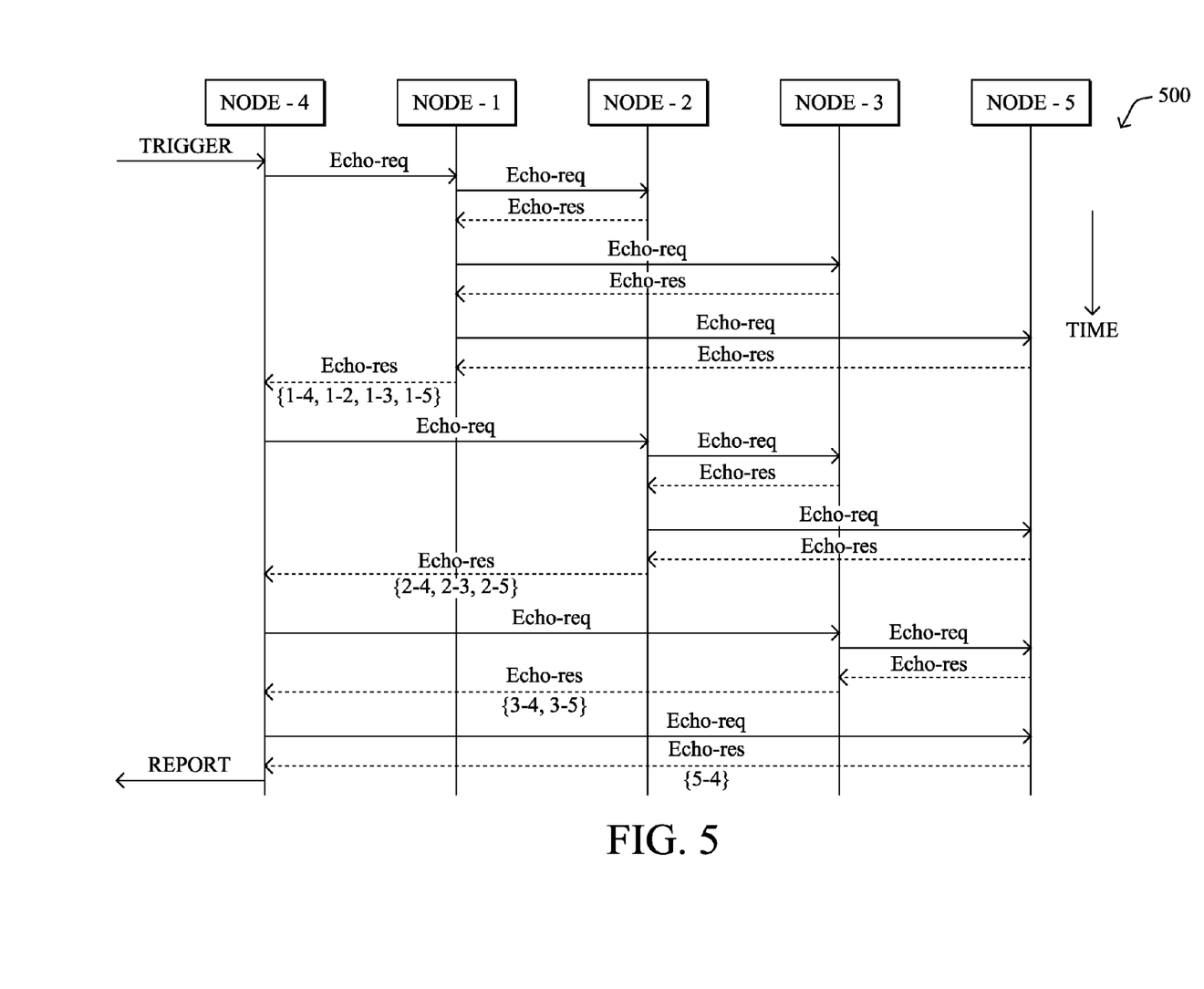
FIG. 5 illustrates an example request-reply echo message exchange.

FIG. 5 illustrates an example request-reply message exchange diagram 500 (e.g., a ladder diagram) in accordance one embodiment of the present disclosure. It should be noted that the nodes 1-5 depicted in FIG. 5 correspond to node 1-5 in the illustrative network topology shown in FIG. 1. As shown in FIG. 5, an originating node (node 4) may receive an initial trigger ("TRIGGER") (e.g., a manual "member circuit query" command from an administrator or other user, a periodic trigger, a trigger in response to a network event, etc.). In response to the trigger, the originating node determines an ordered list of nodes in the full-mesh computer network. The originating node then sends a first echo request 300 ("Echo-req") to a first node (e.g., a first member of the full-mesh computer network 100) according to the ordered list, and waits for a configurable amount of time after sending the request For example, assuming a heuristic ordering of increasing node IDs (lowest to highest ordering), node 4 may send a first echo request 300 to node 1, which has the lowest node ID of any of the nodes. For purposes of this example, it is assumed that each node in the full-mesh computer network 100 receives any echo requests it is sent, and produces a response within the configurable amount of time (i.e., no failures). However, it should be understood that if no response is received from a particular node within a configurable amount of time, then the node may be skipped, and/or connectivity to the node may be specially tested, as discussed below with reference to FIG. 6.

Each non-originating (second level) node in the full-mesh network 100, upon receiving an echo request 300 from the originating node may, for example, determine the ordered list, and send subsequent echo requests to any neighboring nodes subsequent to the node in the ordered list, other than the originating node. Each non-originating node may know not to send a request to the originating node due to the initiating node's node ID 320 in the echo request it receives from the originating node, through mention in the explicit list 330, or by other indicia.

For instance, when non-originating node 1 receives the echo request from originating node 4, assuming a heuristic ordering of increasing node IDs (lowest to highest ordering), node 1 may determine that there are nodes in the ordered list subsequent to node 1, other than the originating node, namely node 2, node 3 and node 5 (i.e., nodes having a "node ID greater than me"). As such, node 1 may send a subsequent echo request 300 to node 2, node 3 and node 5, and wait for a configurable amount of time for responses. Those nodes may return an echo response ("Echo-res") to node 1. Node 1, may then consolidate the echo responses, and return a consolidated echo response 400 to node 4. The consolidated echo response may indicate, using its connectivity list 430, that node 1 can reach node 2 ("1-2"), node 1 can reach node 3 ("1-3"), and node 1 can reach node 4 ("1-4"). The consolidated echo response may further indicate that node 1 can reach node 4 ("1-4"), as would a typical echo response. Thus, is should be understood, that a consolidated echo response may carry far more connectivity information than a typical echo response.

Originating node 4 may next determine that there are remaining nodes on the ordered list, other than itself, and send a second echo request 300. For example, assuming a heuristic ordering of increasing node IDs (lowest to highest ordering), node 4 may send a second echo request 300 to node 2, which has the second lowest node ID. As a non-originating node, node 2, upon receiving the echo request, may determine the ordered list and conclude there are nodes in the ordered list subsequent to node 2, other than the originating node, namely node 3 and node 5. As such, node 2 may send a subsequent echo request 300 to node 3 and node 5, and wait for a configurable amount of time. Those nodes may return an echo response to node 2. Node 2, may then consolidate the echo responses and return a consolidated echo response 400 to node 4. The consolidated echo response may indicate, using its connectivity list 430, that node 2 can reach node 3 ("2-3") and node 2 can reach node 5 ("2-5"). The consolidated echo response may further indicate that node 2 can reach node 4 ("2-4"), as would a typical echo response.

Originating node 4 may next determine that there are still remaining nodes on the ordered list, other than itself, and sends a third echo request 300. For example, assuming a heuristic ordering of increasing node IDs (lowest to highest ordering), node 4 may send a third echo request 300 to node 3. As a non-originating node, node 3, upon receiving the echo request, may determine the ordered list and conclude there is still a node in the ordered list subsequent to node 3, other than the originating node, namely node 5. As such, node 3 may send a subsequent echo request 300 to node 5, and wait for a configurable amount of time. Node 5 may return an echo response to node 3. Then, node 3 may return a consolidated echo response 400 to node 4. The consolidated echo response may indicate, using its connectivity list 430, that node 3 can reach node 5 ("3-5"), as well as that node 3 can reach node 4 ("3-4").

Finally, originating node 4 may next determine that there is one last remaining node on the ordered list, other than itself, and send a forth echo request 300. For example, assuming a heuristic ordering of increasing node IDs (lowest to highest ordering), node 4 may send a fourth echo request 300 to node 5. Node 5, upon receiving the echo request, may determine the ordered list and conclude there are no other nodes in the ordered list subsequent to node 5. As such, node 5 may simply return a consolidated echo response 400 to node 4 indicating that node 5 can reach node 4 ("5-4"). Note that each response that could potentially include a connectivity list 430, may be considered a consolidated echo response, even where the connectivity list 430 is not present or is empty, as would be the case here with node 5. It should be understood that in some cases, such as would be the case with node 5, the connectivity list 430 is not present or is empty, while all nodes are operational, simply due to there being no further need to verify connectivity. In other cases, the connectivity list 430 may be empty, or include a decreased number of indications, due to failures in the full-mesh computer network 100, were a response is not received in a configurable amount of time from certain nodes. Such a circumstance, and the use of focused testing in response thereto, is discussed in more detail below.

Based on the consolidated echo responses, the originating node may determine a connectivity status of the full-mesh computer network 100, for itself and any subsequent nodes. Once the originating node (e.g., node 4) receives all of the responses (or determines that certain nodes are non-responsive), then a consolidated query response ("REPORT") may be generated, including any failures, and, e.g., presented to an administrator. Note that this report may simply be a final consolidated response 400, where the pertinent information may be obtained from connectivity list 430, or some other formatted report may be generated. Note further that the information carried in the connectivity list may contain more than just connectivity status (e.g., basic data plane status information), but may also be extended to contain configuration information, as well as dynamic information about all the links (e.g., tunnels, PWs, etc.). For example, this capability may provide various diagnostic tools, such as determining and maintaining round trip times (RTTs) for one or more requests/responses (e.g., minimum, average, and maximum values), as well as a percentage of responsiveness (e.g., how often the request resulted in a reply, such as for lossy networks). Other information may comprise local and remote labels used for virtual circuits, and their corresponding current states. Those skilled in the art will appreciate that other information may also be carried and obtained from the request/response messages, and that the information shown are merely representative examples.

Figure 6:
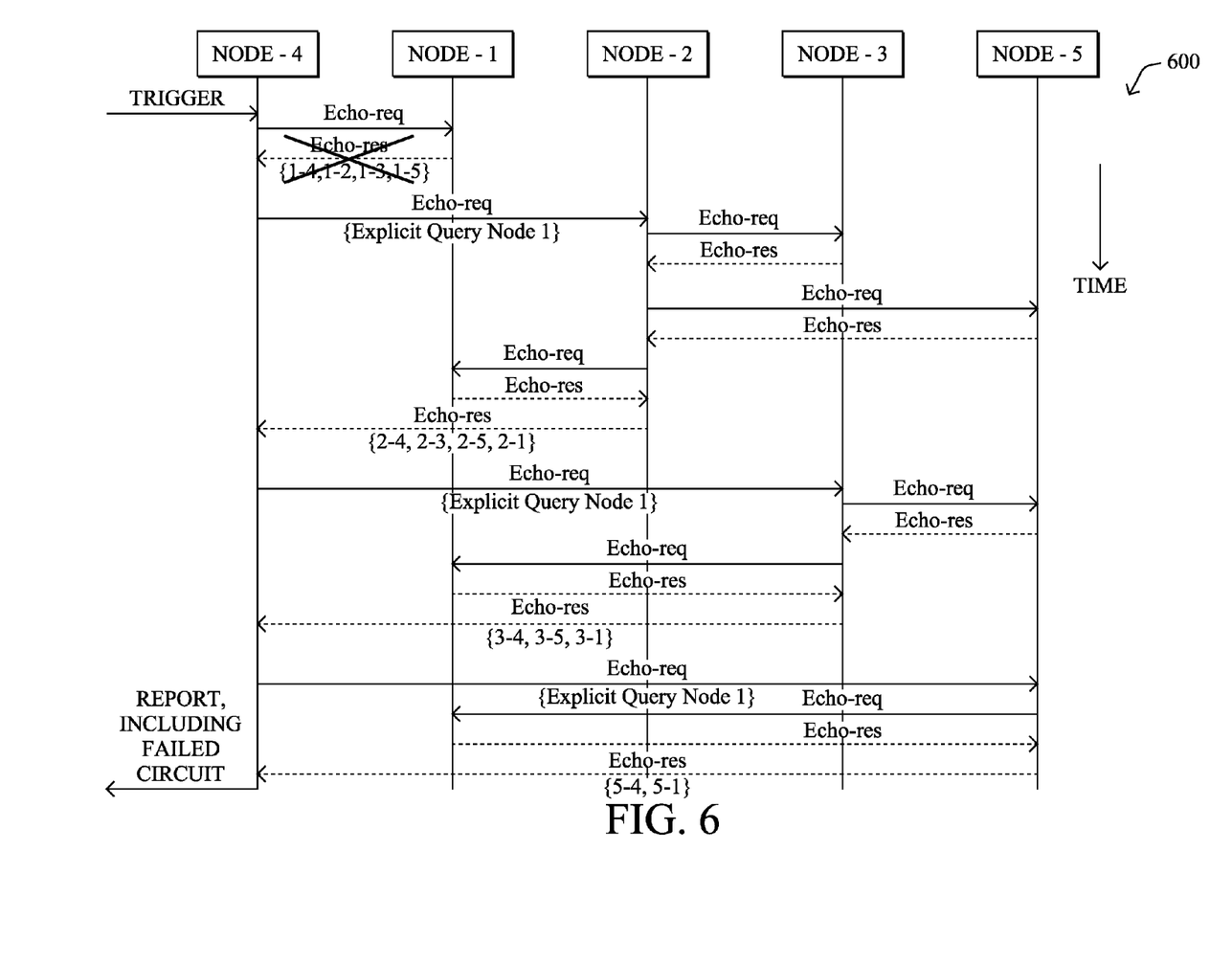
FIG. 6 illustrates another example request-reply echo message exchange.

FIG. 6 illustrates the example embodiment as shown in FIG. 5 above, but this time the diagram 600 shows how a non-responsive node may be handled according to one or more techniques described herein. As shown, node 4 again sends an echo request 300 to node 1, but this time node 1 does not respond. As such, in response to not receiving a query response from the non-responsive non-originating node (node 1), e.g., after waiting a configurable period of time, node 4 may then include an explicit query node list 330 within any query requests sent to other nodes in the ordered list, where the explicit query node list identifies the non-responsive node (node 1), and requests focused testing of such node.

When each non-originating node (e.g., node 2, node 3, node 5) receives the echo request with the explicit query node list 330, in addition to the actions described above in FIG. 5, the non-originating nodes may also send an extra echo request to the explicitly indicated node (e.g., node 1). That is, upon receiving an echo request that has an explicit query node list 330 with an identification of one or more particular nodes, a non-originating node determines its subsequent nodes to which to send a subsequent echo request based on both the progression of the ordered list as described above, and on the explicit query node list 330. Illustratively, node 2 sends an echo request to node 3 and node 5, and also an extra request to node 1, and the consolidated echo response from node 2 to node 4 may indicate, using its connectivity list 440, that node 2 can reach node 3 ("2-3"), that node 2 can reach node 5 ("2-5"), and, as a result of the focused testing, that node 2 can reach node 1 ("2-1"), as well as that node 2 can reach node 4 ("2-4") as would a typical echo response. The same may apply to node 3, which may receive an echo request 300 from node 4 with an explicit query node list 330 indicating node 1, and hence may query node 5, and node 1, prior to replying to node 4. Similarly, node 5 may be caused to also query node 1 prior to replying to node 4. As a result of such focused testing, node 4 may then be able to determine whether node 1 has completely failed (i.e., no responses indicating connectivity from any other node in the full-mesh network), or if simply one or more links have failed (e.g., link 4-1, as shown), and may report these findings.

It should be understood that while FIG. 6 illustrates a case where a failure is detected due to the lack of an echo response in an exchange between the originating node (node 4) and a non-originating node (node 1), a failure may also be detected in an exchange between a non-originating node and another non-originating node. For example, if after sending an echo request to another non-originating node, an echo-response is not received within a configurable period of time at the non-originating node sending the echo request, it will be assumed a failure has occurred, and the non-originating node sending the echo request may omit the non-responsive node from its connectivity list 430 of its consolidated echo response to the originating node. This may, in turn, trigger focused testing of the non-responsive node, according to the techniques discussed above.

Figure 7:
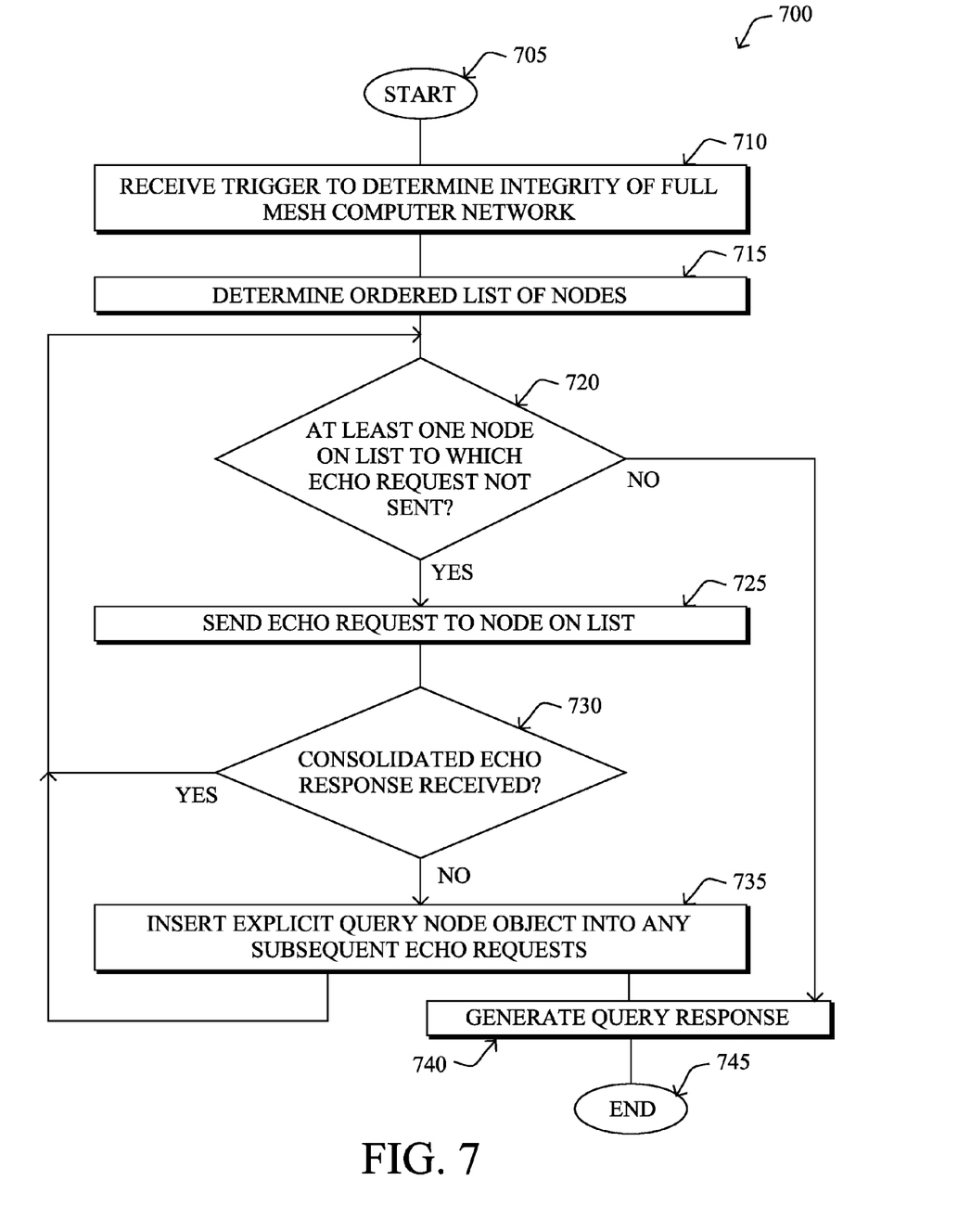
FIG. 7 illustrates an example procedure executed at an originating node for querying health of full-mesh networks.

FIG. 7 illustrates an example procedure 700 executed at an originating node for querying health of full-mesh networks. The procedure 700 starts at step 705, and continues to step 710, where an originating node in a full-mesh computer network receives from an administrator (or other user or entity) a trigger to determine the integrity of the full-mesh network's data-paths *e.g., a "member circuit query" command). At step 715 the originating node may determine an ordered list of nodes in the full-mesh computer network. At step 720, the originating node may determine there is at least one other node on the ordered list to which an echo request has not been sent. If so, at step 725, the originating node sends an echo request 300 to a node on the ordered list, for example, according to one or more heuristics (e.g., beginning with a lowest node on the ordered list), and waits for a configurable amount of time after sending each echo request. At step 730, it is determined if a non-originating node responds to this echo request with a consolidated echo response 400 within the configurable amount of time. If a consolidated echo response 400 to the echo request 300 is received from a non-originating node at the originating node within the configurable amount of time, at step 735, execution may loop to step 720 and the originating node may proceed to send an echo request 300 to the next node on the ordered list. If a consolidated echo response 400 is not received at the originating node within the configurable amount of time, at step 735 the originating node may make a note to insert an explicit query node list 330 into any subsequent echo requests 300, identifying the node that did not produce a response, and requesting focused testing of such node. Execution may then loop to step 720. When step 720 determines there is not at least one other node on the ordered list to which an echo request 300 has not been sent, the originating node, at step 740, may generate a query response indicating the connectivity status of the full-mesh computer network, including any failures. The procedure 700 ends in step 745.

Figure 8:
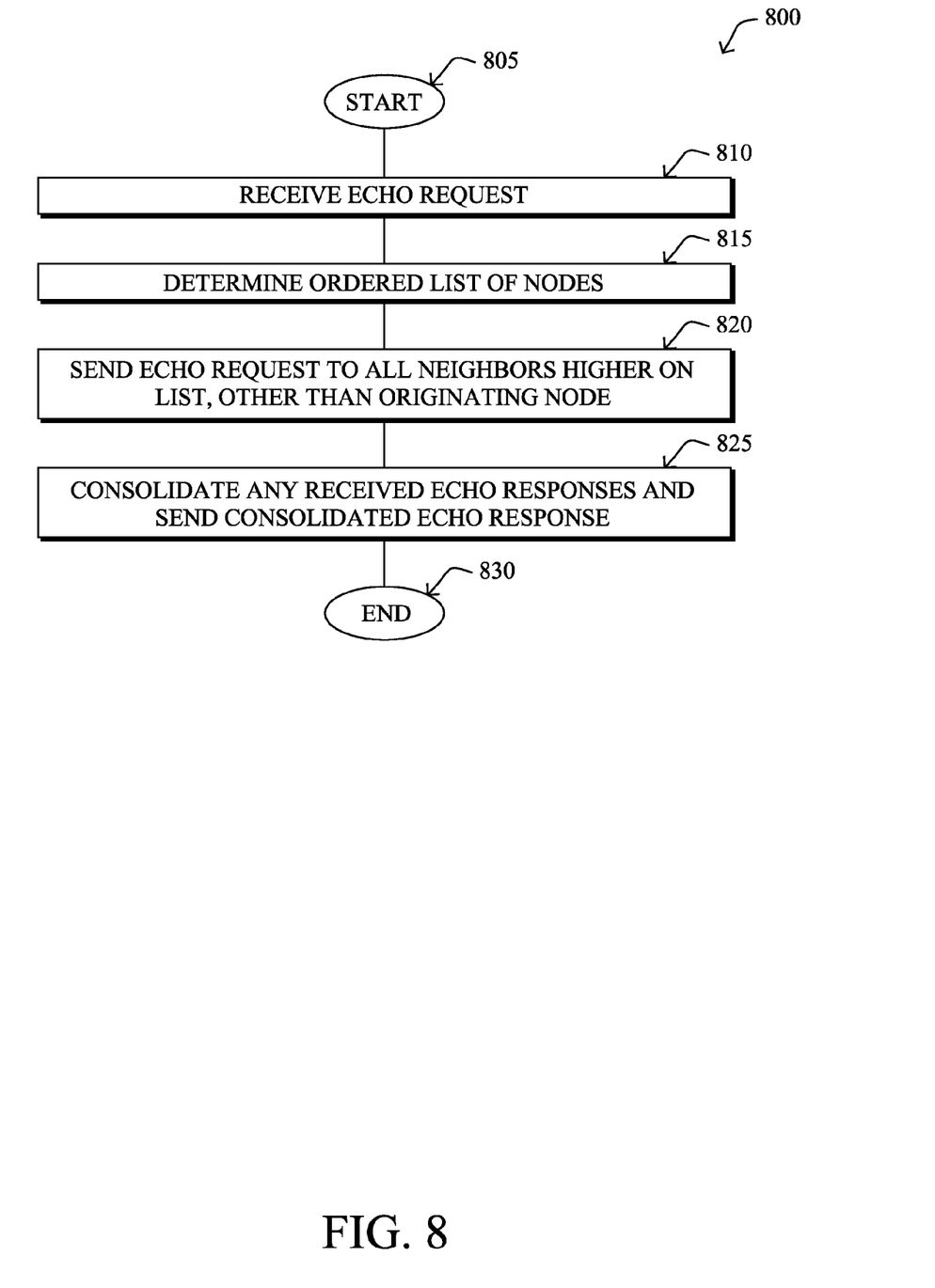
FIG. 8 illustrates an example procedure executed at a non-originating node for querying health of full-mesh networks.

FIG. 8 illustrates an example procedure 800 executed at a non-originating node for querying health of full-mesh networks. The procedure 800 starts at step 805, and continues to step 810, where a non-originating node receives an echo request 300. At step 815, the non-originating node determines its own ordered list in the full-mesh computer network (or alternatively, is provided with one). At step 820, the non-originating node sends echo requests to certain ones of its neighbors, for example based on one or more heuristics, such as a heuristic that causes the non-originating node to send echo requests to all neighbors other than the originating node that are higher on the ordered list than the non-originating node. If an explicit query node list 330 is included within the received echo requests 300 identifying the node that did not produce a response to a previous query, as part of step 820, the non-originating node may send a an extra echo request to such non-responsive node, thereby providing focused testing. At step 825, after a configurable amount of time has elapsed for echo responses to be received at the non-originating node from its neighbors, the non-originating node consolidates any received echo responses and responds to the original echo request from the originating node with a consolidated echo response 400 that indicates its own response, and the responses to its echo requests 300. The procedure ends at step 830.

The novel techniques described herein query the health of full-mesh computer networks. By using the network as a platform, the novel techniques may allow an administrator to validate a full-mesh network, such as a VPLS entity, from any participating node (e.g., any PE). In some implementations, the techniques may be used to efficiently check the health of the data paths in the network as an entire full-mesh computer network, and not simply one link/circuit at a time. Also, the techniques above may alleviate the need to individually log in to all participating nodes to verify the data-plane integrity of the network, and specifically the need to manually compute the data-path status of the full-mesh network (e.g., the VPLS entity) by determining the status of all links/circuits individually. Further, the dynamic aspects of one or more embodiments described herein may alleviate the need for cumbersome and inefficient manual configuration. For instance, an administrator may not need to know all nodes of the full-mesh network to assess its status, which may be particularly useful when dynamically placing nodes within a full-mesh network.

While there have been shown and described illustrative embodiments that query the health of full-mesh computer networks, it is to be understood that various other adaptations and modifications may be made within the spirit and scope of the embodiments herein. For example, the embodiments have been shown and described herein with particular reference to VPLS entities. However, the embodiments in their broader sense are not so limited, and may, in fact, be used with any full-mesh computer network. Also, while the echo messages 300/400 have been generally represented as extensions to VCCV tools or IGMP/LSP "ping" messages, other suitable underlying protocols may be used to transmit the requests/responses, such as proprietary protocols or other connectivity verification protocols (e.g., bidirectional forwarding detection or "BFD" messages).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible, non-transitory computer-readable medium (e.g., disks/CDs/etc.) having program instructions for execution on a processor, or may be implemented in hardware, or may be implemented firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving a trigger at an originating node in a full-mesh computer network to determine integrity of the full-mesh network's data-paths;
determining an ordered list of each of the nodes in the full-mesh computer network;
sending echo requests from the originating node to each non-originating node of the ordered list;
receiving, at the originating node, a consolidated echo response from at least some non-originating nodes to which an echo request was sent, each consolidated echo response indicating a response from the respective non-originating node, and one or more subsequent echo requests sent by that non-originating node to subsequent nodes, and wherein the consolidated echo response comprises primary node connectivity information identifying each node that is connected to the respective non-originating node and secondary node connectivity information identifying each node that is connected to the subsequent nodes;
determining a connectivity status of the full-mesh computer network based on the consolidated echo responses, and wherein
in response to not receiving a consolidated echo response from a non-responsive non-originating node, including an explicit query node list in further echo requests to other non-originating nodes in the ordered list, the explicit query node list identifying the non-responsive non-originating node and requesting focused testing of the non-responsive non-originating node.

2. The method as in claim 1, wherein the sending of echo requests sends each request successively, waiting a configurable amount of time to receive a consolidate echo response from the respective non-originating node before sending an echo request to a next node on the ordered list.

3. The method as in claim 1, wherein the originating node is other than a first node in the ordered list of nodes.

4. The method as in claim 1, wherein the trigger is a command from a user.

5. The method as in claim 1, wherein the trigger is in response to a network event.

6. The method as in claim 1, wherein the ordered list indicates nodes in an order of increasing node identification (ID) values.

7. The method as in claim 1, further comprising:
including in the echo requests sent from the originating node to each of the non-originating nodes the explicit query node list explicitly instructing the non-originating nodes to send subsequent echo requests to one or more nodes on the explicit query node list.

8. The method as in claim 1, wherein the full-mesh computer network is a virtual private local area network (LAN) service (VPLS) entity.

9. The method as in claim 1, wherein the nodes of the full-mesh computer network are connected over connections selected from a group consisting of: physical links, wireless links, virtual circuits, tunnels, and pseudowires.

10. The method as in claim 1, further comprising:
receiving, at a particular non-originating node, an echo request from the originating node;
in response to the echo request from the originating node, sending subsequent echo requests from the particular non-originating node to one or more subsequent nodes on the order list of nodes;
receiving, at the particular non-originating node, an echo response from at least some of the subsequent nodes to which an echo request was sent; and
sending a consolidated echo response to the originating node, the consolidated echo response indicating a response from the particular non originating node, and any responses to subsequent echo requests sent by that particular non-originating node to subsequent nodes.

11. A method comprising:
receiving, at a non-originating node in a full-mesh computer network, an echo request from an originating node, wherein the echo request comprises an explicit query node list identifying at least one non-responsive non-originating node for which a consolidated echo response was not received by the originating node within a configurable amount of time, and wherein the echo request further comprises a request for focused testing of the non-responsive non-originating node;
in response to the echo request from the originating node, sending subsequent echo requests from the non-originating node to one or more subsequent nodes on an order list of each of the nodes in the full-mesh computer network;
receiving, at the non-originating node, an echo response from at least some of the subsequent nodes to which an echo request was sent; and
sending a consolidated echo response to the originating node, the consolidated echo response indicating a response from the non-originating node, and one or more subsequent echo requests sent by the non-originating node to subsequent nodes, and
wherein the consolidated echo response comprises primary node connectivity information identifying each node that is connected to the respective non-originating node and secondary node connectivity information identifying each node that is connected to the subsequent nodes.

12. The method as in claim 11, further comprising:
determining, at the non-originating node, an ordered list of nodes in the full-mesh computer network; and
determining the one or more subsequent nodes based on the ordered list.

13. The method as in claim 11, wherein the echo request from the originating node includes an explicit query node list explicitly instructing the non-originating node to send subsequent echo requests, and the method further comprises:
sending at least one subsequent echo request from the non-originating node in response to the explicit query node list.

14. The method as in claim 11, wherein the echo request from the originating node includes an explicit query node list explicitly instructing the non-originating node of one or more nodes to send subsequent echo requests, and the method further comprises:
determining the one or more subsequent nodes based on the explicit query node list.

15. An apparatus, comprising:
one or more network interfaces configured to communicate within a full-mesh computer network;
a processor coupled to the network interfaces and configured to execute one or more processes; and
a memory configured to store a process executable by the processor, the process when executed operable to:

receive a trigger to determine integrity of the full-mesh network's data paths,
determine an ordered list of each of the nodes in the full-mesh computer network,
send echo requests from the apparatus to non-originating nodes of the ordered list,
receive a consolidated echo response from at least some non-originating nodes to which an echo request was sent, each consolidated echo response indicating a response from the respective non-originating node, and one or more subsequent echo requests sent by that particular non-originating node to subsequent nodes, and wherein the consolidated echo response comprises primary node connectivity information identifying each node that is connected to the respective non-originating node and secondary node connectivity information identifying each node that is connected to the subsequent nodes, and determine a connectivity status of the full-mesh computer network based on the consolidated echo responses, and wherein
in response to not receiving a consolidated echo response from a non-responsive non-originating node, including an explicit query node list in further echo requests to other non-originating nodes in the ordered list, the explicit query node list identifying the non-responsive non-originating node and requesting focused testing of the non-responsive non-originating node.

16. The apparatus as in claim 15, wherein the process when executed is further operable to:
wait a configurable amount of time to receive a consolidate echo response from the respective non-originating node before sending an echo request to a next node on the ordered list.

17. The apparatus as in claim 15, wherein the ordered list indicates nodes in an order of increasing node identification (ID) values.

18. The apparatus as in claim 15, wherein the process when executed is further operable to:
include in the echo requests sent from the apparatus to each of the non-originating nodes the explicit query node list explicitly instructing the non-originating nodes to send subsequent echo requests.

\* \* \* \* \*